Nov. 6, 1962    A. J. M. SPIERCKEL    3,062,321
SEMI-AUTOMATIC LUBRICATING DEVICE
Filed Nov. 16, 1961

Inventor:
Spierckels

United States Patent Office 3,062,321
Patented Nov. 6, 1962

3,062,321
SEMI-AUTOMATIC LUBRICATING DEVICE
Armand J. M. Spierckel, 53 Ave. Brugmann,
Brussels 6, Belgium
Filed Nov. 16, 1961, Ser. No. 152,741
Claims priority, application Belgium Nov. 21, 1960
4 Claims. (Cl. 184—40)

This invention relates to a semi-automatic lubricating device designed, in particular, for the lubrication of mechanical joints on motor vehicles (front axle, steering, stub axles, etc.). It can however be used for the lubrication of any mobile engine parts where lubrication at regular intervals is required. The lubricating device according to the invention requires, to be operated, the use of a supply of compressed air. The device can also be used for distributing equal amounts of all types of liquids of any particular viscosity grade.

Central lubricating pumps for motor vehicles already exist. These are usually operated by the action of the driver's foot and must be actuated at frequent intervals, say every 100 miles, because only a comparatively fluid lubricant can be used in connection with these pumps.

An object of the present invention is the designing of a central lubricating device, connected by pipes to the various parts to be lubricated and operated by means of the compressed air obtainable from any garage and service station.

Another object of the invention is the distribution of lubricant by means of a device permanently fitted to the vehicle, to all joints which require periodical lubrication.

A further object of the invention is the designing of a device which distributes the exact amount of lubricant required to the various parts to be lubricated.

Still another object of the invention is the designing of a device capable of distributing stiff lubricant.

According to the invention, these objects are attained by means of a device comprising two communicating cylinders, one of which contains the supply of lubricant, while the other forms the distributing pump. Each cylinder is equipped with a piston which can be operated by the compressed air admitted into the cylinder through a nipple. The piston of the cylinder forming the distributing pump has a bore hole which helically guides a distribution rod, which in turn has a duct through which the lubricant is expelled, when the pump is operated, successively through a plurality of channels situated in a ring and connected to pipes leading to the various lubricating points.

The invention will now be described with reference to the accompanying drawing, illustrating, by way of example, one preferred embodiment.

Figure 1:
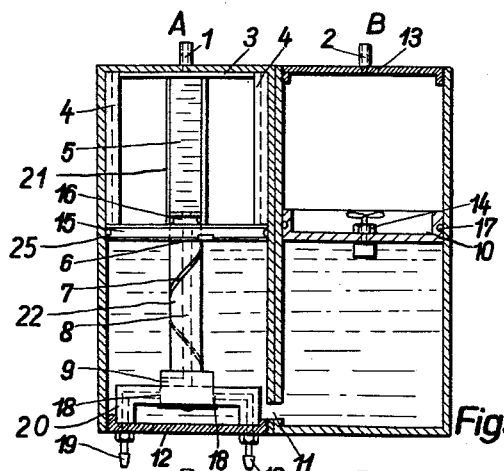
FIG. 1 is a sectional elevation view of the lubricating device.
Figure 4:
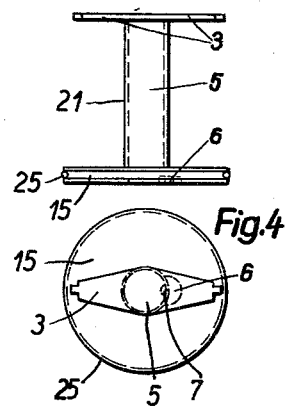
FIG. 4 is a sectional elevation and a plan view of the piston of the pump cylinder.

Referring now to the drawings, there is illustrated a device comprising two cylinders, a pump cylinder A and a supply cylinder B, communicating at their bottom ends by a duct 11. Cylinder A has at its upper end a nipple 1 which can be connected to a compressed air supply, while cylinder B has a similar nipple 2 which can also be connected to a compressed air supply.

Cylinder B has a removable lid 13 and contains a free slidable piston 10 equipped with a tore-shaped packing 17 and fitted, at its center, with a cock 14 which, when open, allows the air cushion to escape.

Pump cylinder A is provided inside, in its upper half, with two guide bars 4, which guide, in a non-rotational translation motion, a piston 21 consisting of a hollow axle 5, a guiding flange 3 and a piston plate 15 provided with a tore-shaped packing 25.

A pin 6 permanently fitted onto plate 15 controls, inside the hollow axle 5 of piston 21, the helical motion of a distribution rod 22 which has on its outer surface a helical groove 7, and which is equipped with a tore-shaped packing 16. The distribution rod 22 is provided inwardly along its axis with a distribution channel 8, which at its lower end is bent at right angle. Owing to its helical guidance, the distribution rod rotates through 360° each time piston 21 performs a stroke from top to bottom or inversely. The upward stroke of the distribution rod 22 is limited by a protruding plate 23 fitted at the lower end of rod 22 and bearing a tip 24, said plate 23 striking against the lower part of a distributing ring 20, containing a plurality of channels 18, each one of which being connected by means of a nipple 19 to pipes (not shown) leading to the various lubricating points. When the distribution rod 22 is in its lowest position, with tip 24 under plate 23 resting on base 12 of cylinder A (FIGS. 2 and 3), outlet 9 of channel 8 is level with the inlets of channels 18 inside the ring 20. When distribution rod 22 is at its highest position (FIG. 1), outlet 9 of channel 8 communicates with the inside of cylinder A.

The device is operated as follows: After lid 13 and free slidable piston 10 have been removed, the lubricant is introduced into cylinder B. During this operation, the parts in cylinder A should occupy the position shown by FIG. 3, with distribution rod 22 and piston 21 in their lowermost position. Piston 10 is placed back into cylinder B with cock 14 open, so that the air cushion can be allowed to escape. Cock 14 is closed and lid 13 is then screwed back on top of cylinder B. After filling, the different parts of the device are thus in the respective positions shown in FIG. 3. Nipple 2 is then connected to a compressed air pipe. Due to the action of the compressed air, piston 10 goes down and presses back the lubricant from cylinder B through duct 11 into cylinder A. Here, again under the action of the compressed air, the lubricant raises piston 21, which, due to the vacuum induced in hollow axle 5, lifts distribution rod 22 until plate 23 strikes against the lower face of distributing ring 20. At this stage the lubricant penetrates through outlet 9 into channel 8 of distribution rod 22, thus filling hollow axle 5, where the vacuum assists in the filling process. When flange 3 strikes the top of cylinder A, the priming of the lubricating device is completed (see FIG. 1).

Figure 2:
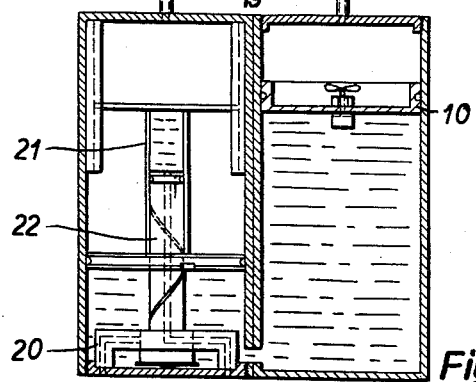
FIGS. 2 and 3 are similar views at different stages of the operation of the device.
Figure 5:
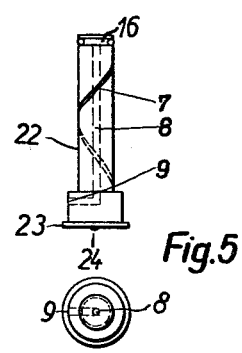
FIG. 5 is a sectional elevation and a plan view of a distribution rod guided inside a bore of the piston shown in FIG. 4.
Figure 3:
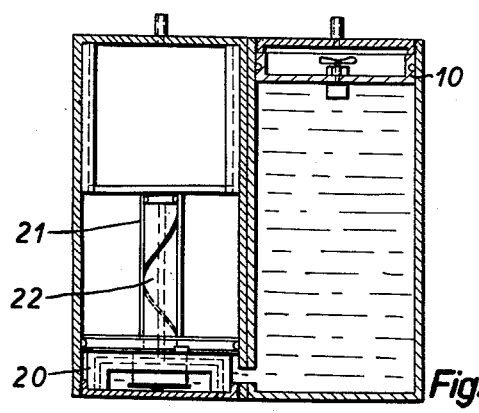
Figure 6:
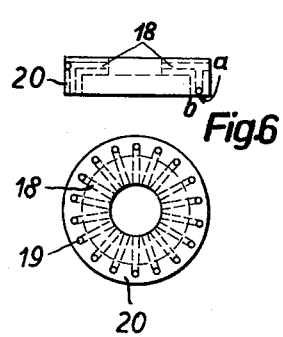
FIG. 6 is a sectional elevation and a plan view of the distributing ring.

The compressed air pipe is then connected onto nipple 1 of cylinder A. The compressed air causes piston 21 to go down. This motion of piston 21 causes immediately the lowering of distribution rod 22, whose outlet 9 is then level with the inlets of channels 18 of distributing ring 20. The downward stroke of piston 21 causes also a rotation of 360° of rod 22, owing to the fact that pin 6 is engaged in the helical groove 7 on the outer surface of distribution rod 22. As a result, the lubricant is distributed, under pressure and in a uniform manner, among channels 18 which are connected to the various lubrication points. FIG. 2 shows the position of the different parts of the device during lubrication, after distribution rod 22 has revolved through 180°, while FIG. 3 shows the device at the end of the lubrication operation, ready for further use.

While one embodiment of the semi-automatic lubricating device has been illustrated and described, the in-

What is claimed is:

1. A semi-automatic lubricating device comprising a first cylindrical vessel, a free piston slidable inside said first cylindrical vessel, said free piston being equipped with a cock at its center, a removable lid at the top of said first cylindrical vessel, said lid being equipped with a nipple intended to be connected to a supply of compressed air for operation of the device, a second cylindrical vessel, said first and said second cylindrical vessels communicating at their bottom ends, a nipple at the top of said second cylindrical vessel, said nipple being intended to be connected to a supply of compressed air for operation of the device, a piston inside said second cylindrical vessel, said piston consisting of a hollow axle, of a guiding flange at the upper end of said hollow axle and of a piston plate at the lower end of said hollow axle, means for the translational guiding of said piston inside said second cylindrical vessel, a distribution rod guided inside the hollow axle of said piston, means on said piston inside the second cylindrical vessel and on said distribution rod cooperating for rotating said distribution rod when said piston performs a translation movement, a channel inside said distribution rod, a distributing ring at the bottom of said second cylindrical vessel, said distributing ring containing a plurality of channels the outlets of which being intended to be connected each to a lubricating point, the lower side of said distributing ring limiting the upward stroke of said distributing rod by means of an abutment piece on said rod, the outlet of the channel inside said distribution rod being in free communication with the interior of the second cylindrical vessel when said distribution rod is at the upper end of its stroke, said outlet being level with the inlets of the channels contained in the distributing ring when said distribution rod is at the lower end of its stroke.

2. A semi-automatic lubricating device as claimed in claim 1, in which the means for the translational guiding of the piston inside the second cylindrical vessel consist of two guide bars fastened to the inner surface of the second cylindrical vessel.

3. A semi-automatic lubricating device as claimed in claim 1 in which the means on said piston inside the second cylindrical vessel and on said distribution rod cooperating for rotating said distribution rod when said piston performs a translation movement consist of a pin on the piston plate engaged in a helical groove on the outer surface of said distribution rod.

4. A semi-automatic lubricating device as claimed in claim 1, in which the piston inside the first cylindrical vessel, the piston inside the second cylindrical vessel and the distribution rod are each equipped with a tore-shaped packing.

References Cited in the file of this patent

UNITED STATES PATENTS

| 262,682 | McAuley | Aug. 15, 1882 |
| 1,661,521 | Zimmerman | Mar. 6, 1928 |
| 1,886,067 | Moses | Nov. 1, 1932 |
| 2,628,636 | Brockman | Feb. 7, 1953 |
| 2,888,098 | Florence | May 26, 1959 |